United States Patent
Suokas et al.

[11] Patent Number: 6,146,764
[45] Date of Patent: Nov. 14, 2000

[54] POLYMER FILMS AND PROCESS FOR THE PREPARATION THEREOF

[75] Inventors: Esa Suokas, Tampere; Mika Härkönen, Vantaa, both of Finland

[73] Assignee: Neste OY, Espoo, Finland

[21] Appl. No.: 08/537,889

[22] PCT Filed: Feb. 28, 1995

[86] PCT No.: PCT/FI95/00115

§ 371 Date: Oct. 30, 1995

§ 102(e) Date: Oct. 30, 1995

[87] PCT Pub. No.: WO95/23180

PCT Pub. Date: Aug. 31, 1995

[30] Foreign Application Priority Data

Feb. 28, 1994 [FI] Finland ................................... 940953

[51] Int. Cl.[7] ................................................... C09K 19/00
[52] U.S. Cl. ................... 428/412; 428/423.5; 428/423.7; 428/424.2; 428/424.4; 428/424.6; 428/424.7; 428/424.8; 428/473.5; 428/451; 428/475.2; 428/476.3; 428/476.9; 428/483; 428/516; 428/517; 428/518; 428/520; 428/521; 264/319; 264/330; 264/331.12; 264/331.18; 264/331.21

[58] Field of Search .................... 428/412, 423.5, 428/423.7, 424.2, 424.4, 424.6, 424.7, 424.8, 473.5, 451, 475.2, 476.3, 476.9, 483, 516, 517, 518, 520, 521; 264/319, 330, 331.12, 331.18, 351.21

[56] References Cited

U.S. PATENT DOCUMENTS

| | | | |
|---|---|---|---|
| 5,084,352 | 1/1992 | Percec | 428/412 |
| 5,238,638 | 8/1993 | Isayev | 264/257 |
| 5,248,530 | 9/1993 | Jester | 428/1 |
| 5,654,045 | 8/1997 | Jester | 428/1 |

FOREIGN PATENT DOCUMENTS

| | | |
|---|---|---|
| 429 654 | 6/1991 | European Pat. Off. . |
| 466 085 | 1/1992 | European Pat. Off. . |
| 532 766 | 3/1993 | European Pat. Off. . |
| WO 9324574 | 12/1993 | WIPO . |

*Primary Examiner*—Leszek Kiliman
*Attorney, Agent, or Firm*—Cohen, Pontani, Lieberman & Pavane

[57] ABSTRACT

The lamellar layer is formed by overlapping plates of the liquid crystalline polymer in the isotropic matrix. The oxygen transmission rate of a 50 $\mu$m thick layer of the monolayer structure is typically less than 150 $cm^3/(m^2 \cdot d \cdot bar)$.

17 Claims, 3 Drawing Sheets

POLYMER FILMS AND PROCESS FOR THE PREPARATION THEREOF

FIELD OF THE INVENTION

The present invention relates to polymer films. Such films are based on compounded blends of anisotropic and isotropic polymers.

The invention also concerns a process for preparing polymer films based on compounded blends of anisotropic and isotropic polymers. Furthermore, the invention relates to laminates comprising a lignocellulosic substrate and at least one polymer layer coated on the surface of the substrate, with the polymer layer acting as a barrier to the transport of oxygen and water vapour through the laminate.

BACKGROUND OF THE INVENTION

In food container laminates, aluminum foils have traditionally been used as sealing layers to protect the foodstuff from deterioration caused by contact with oxygen and moisture. Nowadays, the aluminum foils are to an increasing extent being replaced by various polymer films, which have good barrier properties, but which are more easily degradable in nature than aluminum. Since no single polymer can provide the same resistance to gas and water penetration as aluminum, the polymer-based laminates typically comprise multilayered polymer structures. Often, these structures incorporate thermoplastic polymers, such as polyolefins, which are heat sealable and thus make it possible to manufacture continuous structures. The polyolefins themselves are known to have excellent moisture and water vapor resistance, but they suffer from poor gas barrier properties. Therefore, the multilayer polymer structures usually include a specific gas barrier material, such as ethylene/vinyl alcohol (EVOH). A conventional polyethylene-EVOH-based multilayer product has the following structure:

PE/adhesive polymer/EVOH/adhesive polymer/PE).

It is known that rigid rod polymers, like thermotropic liquid crystalline polymers (LCP), have excellent barrier properties. However, the processing of them is difficult due to anisotropic behavior. Because the price of the liquid crystalline polymers is also rather high, LCP's have not been used as barrier materials in practical applications.

U.S. Pat. No. 5,084,352 describes a multilayered barrier film product, which includes a first polymer having low permeability to moisture and a heterogeneous polymer blend film containing a gas barrier polymer. The heterogeneous film comprises a barrier polymer, such as EVOH, together with a second polymer, which is distributed within the barrier polymer. The second polymer comprises a polyolefin which is functionalized, so as to allow the heterogeneous polymer film to adhere to the first polymer film having low permeability to moisture. Among the alternative barrier polymers, which may not necessarily be utilized in packaging applications, liquid crystalline polymers are mentioned. No examples of the use of LC polymers are given nor are any concentration ranges suggested.

EP Patent Application No. 0 503 063 discloses a composite film comprising a liquid-crystal polymer layer containing a thermotropic liquid crystal polymer and a thermoplastic polymer layer laminated on at least one surface of the liquid crystal polymer layer. The polymer layer is laminated on the liquid crystalline polymer through an adhesive layer. The use of such a layer can be avoided by functionalizing the thermoplastic in order to ensure proper attachment to the LCP film.

Structures similar to the ones mentioned above are also described in JP Published Patent Applications Nos. 2 220 821, 2 253 949 to 2 253 951, and 2 261 456.

The main problem associated with the known multilayer films resides in the fact that the adjacent layers are comprised of different kinds of polymers and, in order to get them attached to each other, either an adhesive tie layer has to be applied between the adjacent layers or, as described above, the thermoplastic polymers have to be functionalized to provide adhesive properties.

According to the prior art, good barrier properties are only obtained if the LCP forms a homogeneous film layer, which means that the LCP proportion of the whole multi-layer structure becomes rather high. This increases the costs of the multilayered films.

Additionally, the preparation of the multilayered structures often comprises several manufacturing stages and can therefore be costly and time consuming.

SUMMARY OF THE INVENTION

It is, therefore, an object of the present invention to eliminate the above problems and to provide a polymer structure essentially comprising a uniaxially or biaxially oriented polymer film having, at reasonably high LCP concentration, similar or better barrier properties, in particular to the transport of oxygen therethough, than existing multilayer films, while still exhibiting acceptable mechanical properties (e.g. tensile, shear and puncture properties).

It is another object of the present invention to provide a simplified process for preparing LCP-containing barrier structures. A third object of the present invention is to provide laminates containing LCP/thermoplastic-films.

The invention is based on the concept of utilizing the excellent barrier properties of liquid crystalline polymers while reducing the anisotropy and the effect of the high price of the LCP's on the price of the film by blending the LCP's with isotropic polymers. In particular, the invention provides a compounded monolayer barrier material, which basically is composed of a blend of at least one anisotropic rigid-rod liquid crystalline polymer and at least one flexible isotropic polymer. The former acts as a barrier material against gas penetration because of the rigid linear molecules, the packing density of which is high in solid state. The latter acts as a matrix material which, in addition, provides resistance to the penetration of water vapor. The isotropic polymer preferably comprises a thermoplastic polymer which makes the material heat sealable.

According to the invention, the liquid crystalline polymer is essentially located in at least one lamellar layer embedded in the polymer matrix. The lamellar layer extends over the length and width of the film and prevents oxygen transmission through the film in a transverse direction. The lamellar layer is preferably formed by overlapping plates of the liquid crystalline polymer in the isotropic matrix. The oxygen transmission rat of a 50 $\mu$m thick layer of the monolayer structure according to the invention is typically less than 150 $cm^3/(m^2 \cdot d \cdot bar)$, determined according to the standard ASTM D 3985 - 81.

The process of preparing the above defined monolayer polymer materials comprises the steps of providing a polymer blend containing 60 to 95 parts by volume of an isotropic polymer and 5 to 40 parts by volume of an anisotropic liquid crystal polymer, melt processing the polymer blend at a ratio of the viscosity of the anisotropic polymer to the viscosity of the isotropic polymer [$\lambda = \eta_{anisotropic\ polymer}/\lambda_{isotropic\ polymer}$] which is in the range of about 0.001 to 0.5 in order to produce a polymer compound, and processing the polymer compound into a polymer film.

The laminate suited for use, for instance, in food containers is formed a substrate and at least one polymer layer coated on a surface of the substrate so that the polymer layer acts as a barrier to transport of oxygen and water vapor through the laminate. The polymer layer is composed of a polymer film formed of a compound of at least one anisotropic liquid crystalline polymer and at least one isotropic polymer. The isotropic polymer forms a polymer matrix of the film and the anisotropic liquid crystalline polymer is essentially located in at least one lamellar layer embedded in the polymer matrix and at least substantially extending over a length and width of the film. The film has an oxygen transmission rate that is less than about 150 cm$^3$/(m$^2$·d·bar), determined according to ASTM D 3985-81.

BRIEF DESCRIPTION OF THE DRAWINGS

The present invention is described below in greater detail with reference to the accompanying drawings, of which

DETAILED DESCRIPTION OF THE INVENTION

Definitions

Figure 1:
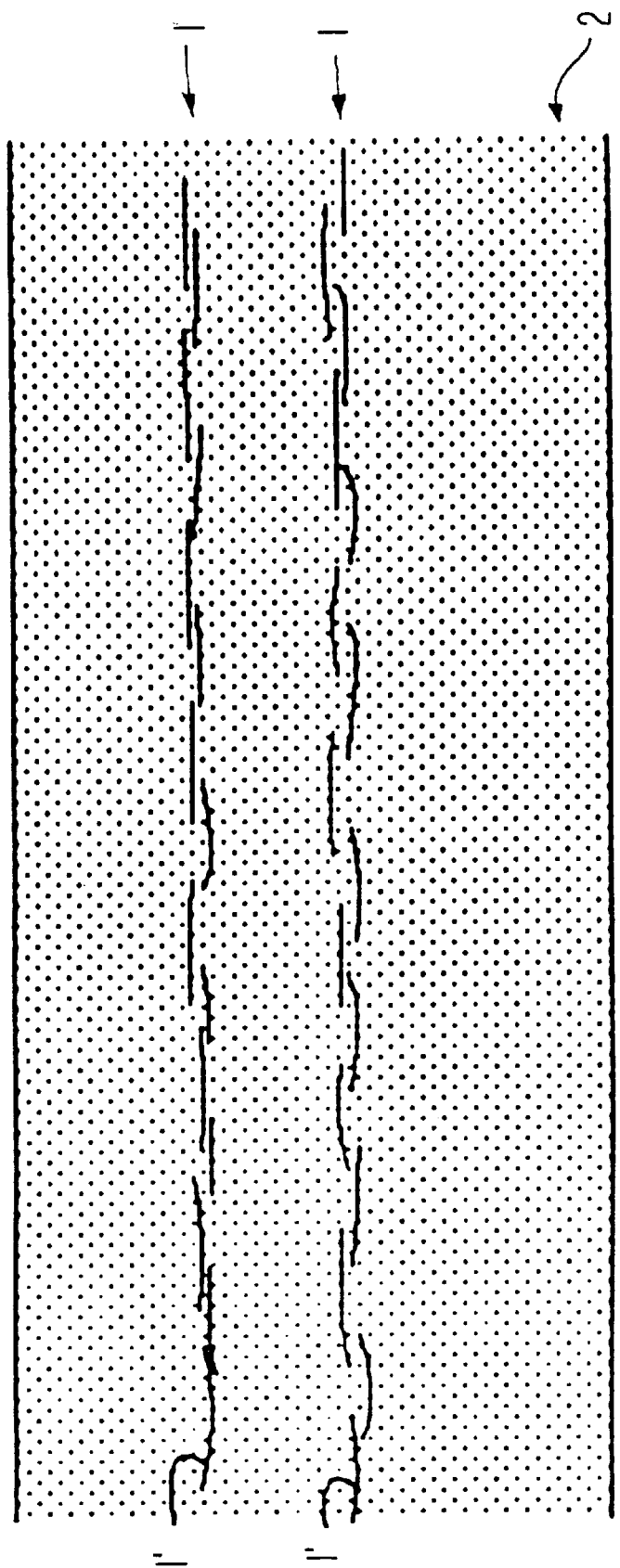
FIG. 1 depicts in a schematic section view the structure of a monolayer film according to the invention.

Within the scope of the present invention the term "film" encompasses thin structures having at least substantially flat and smooth surfaces. Thus, in the following, the term "film" is used synonymously with "sheet".

"Lamellar layer" denotes a layer which is comprised of thin plates or ribbons (lamellas), which are preferably biaxially orientated.

The term "isotropic polymer" designates any thermoplastic polymer which does not decompose below its melting point and which therefore can be melt processed.

The terms "anisotropic polymer" or "liquid crystalline polymers (LCP's)" are interchangeably used for polymers which in liquid state, in particular as a melt (=thermotropic LCP's), lie between the boundaries of solid crystals and isotropic liquids.

Physical mixtures of two or more (neat) polymers, if desired mixed with suitable additives and adjuvants, are called "blends", whereas the term "compounds" designates polymer blends typically also containing additives and adjuvants, which have been processed into a homogeneous mixture, which can be used for the manufacture of the polymer product, for instance a film or a sheet. Polymer blends do not form single-phase systems in material processing and application conditions and their properties depend on the dispersion of the components and are usually linked to the arithmetic average of the values of the components.

For the purpose of this description the term "compatibilizer" means a substance which promotes the compatibility of the isotropic and anisotropic components of the compounds.

"Reactive compatibilizer containing functional groups" denotes a polymer which is capable of reacting with at least one of the components of the blend. In practice it is difficult to determine the exact nature of the interaction between the compatibilizer and the other components of the blend, and to ascertain whether a chemical reaction has taken place or not. Therefore, within the scope of the present application, all polymers which contain functional groups capable of reacting with the functional groups of the matrix polymer and/or liquid crystalline polymer, are considered to be reactive compatibilizers.

The polymer film components

As mentioned above, the polymer films are comprised of isotropic and anisotropic polymers which together provide a monolayer structure, the isotropic polymer forming the matrix in which the anisotropic polymer is embedded. Optionally, the polymer films further contain compatibilizers and additives and adjuvants.

The liquid crystalline polymer of the monolayer may, for instance, comprise an aromatic main chain thermotropic polymer, preferably a thermotropic polyester, poly(ester amide), poly(ester ether), poly(ester carbonate) or poly(ester imide). It can also comprise a copolymer of a polyester, such as a copolymer of poly(ethylene terephthalate) and hydroxy benzoic acid or a copolymer of hydroxynaphthoic acid and hydroxybenzoic acid.

Generally, the liquid crystalline polymer, which is used in the present invention, can be defined as a polymer which is formed when the components of the following general formulas (or at least two of them) are reacted with each other: a dicarboxylic acid of formula I

HOOC—R$_1$—COOH            (I)

a diol of formula II

HO—R$_2$—OH            (II)

a hydroxycarboxylic acid of formula III

HO—R$_3$—COOH            (III)

wherein

R$_1$, R$_2$, and R$_3$ each independently represents
a bivalent aromatic hydrocarbon group,
a group of formula R$_4$—X—R$_5$, wherein R$_4$ and R$_5$ represent a bivalent hydrocarbon group and X is an oxygen or a sulphur atom, a sulphonyl, carbonyl, alkylene, or ester group or X is a single bond,
a xylylene group or
a bivalent aliphatic hydrocarbon group.

The liquid crystalline polymer can also comprise a homopolymer of a hydroxycarboxylic acid of formula IV

HO—R$_3$—COOH            (IV)

Typically, the aromatic dicarboxylic acids of formula I are selected from the group comprising terephthalic acid, isophthalic acid, 4,4'diphenyl-dicarboxylic acid, diphenyl ether-4,4'-dicarboxylic acid, diphenylethane-3,3'-dicarboxylic acid, diphenylethane-4,4'-dicarboxylic acid, diphenyl ether-3,3'-dicarboxylic acid, 4,4'-triphenyl-dicarboxylic acid, 2,6-naphthalenedicarboxylic acid, diphenoxyethane-4,4'-dicarboxylic acid, diphenoxybutane-4,4'-dicarboxylic acid, diphenoxyethane-3,3'-dicarboxylic acid, and naphthalene-1,6-dicarboxylic acid.

Said aromatic dicarboxylic acids may be alkyl-, alkoxy-, or halogen-substituted. The substituted derivatives can be selected from the group comprising chloroterephthalic acid, dichloroterephthalic acid, bromoterephthalic acid, methylterephthalic acid, dimethylterephthalic acid, ethylterephthalic acid, methoxyterephthalic acid, and ethoxyterephthalic acid.

The alicyclic dicarboxylic acids of formula I can be selected from the group comprising trans-1,4-cyclohexanedicarboxylic acid, cis-1,4-cyclohexanedicarboxylic acid, and 1,3-cyclohexanedicarboxylic acid.

The alicyclic dicarboxylic acids may also be substituted by one or more alkyl-, alkoxy-, or halogen-substituent(s). The substituted dicarboxylic acid derivatives can be selected from the group comprising trans-1,4-(1-methyl)-cyclohexane-dicarboxylic acid and trans-1,4-(1-chloro)cyclohexane-dicarboxylic acid.

The aromatic diols of formula II can be selected from the group comprising hydroquinone, resorcinol, 4,4'-dihydroxydiphenyl, 4-4'-dihydroxytriphenyl, 1,6-naphthalenediol, 2,6-naphalene-diol, 4,4'-dihydroxydiphenyl ether, 3,3'-dihydroxydiphenyl, 1,1-bis(4-hydroxyphenyl)-methane, bis(4-hydroxyphenoxy)-ethane, 2,2-bis(4-hydroxyphenyl)propane, and 3,3'-dihydroxy-diphenyl ether. These diols may be substituted by one or more alkyl-, alkoxy-, or halogen substituent(s), which derivatives are exemplified by the following list: chlorohydroquinone, methylhydroquinone, 1-butylhydroquinone, phenylhydroquinone, methoxy-hydroquinone, phenoxyhydroquinone, 4-chlororesorcinol, and methylresorcinol.

Typical examples of alicyclic diols of formula II include trans- and cis- 1,4-cyclohexanediols, trans-1,4-cyclohexane-dimethanol, trans-1,3-cyclohexanediol, cis-1,2-cyclohexanediol, and trans-1,3-cyclohexanedimethanol. Instead of these compounds the corresponding alkyl-, alkoxy-, or halogen-substituted derivatives can be used, as well.

The aliphatic diols of formula II can be straight-chained or branched and selected from the group comprising ethylene glycol, 1,3-propanediol, 1,4-butanediol, and neopentyl glycol.

The aromatic hydroxycarboxylic acids of formula III are selected from the group comprising 4-hydroxybenzoic acid, 3-hydroxybenzoic acid, 6-hydroxy-2-naphthoic acid, and 6-hydroxy-1-naphthoic acid. These compounds can be alkyl-, alkoxy-, or halogen- substituted. The substituted aromatic hydroxycarboxylic acid derivatives are preferably selected from the group comprising 3-methyl-4-hydroxybenzoic acid, 3,5 -dimethyl-4-hydroxybenzoic acid, 2,6-dimethyl-4-hydroxybenzoic acid, 3-methoxy-4-hydroxy-benzoic acid, 3,5-dimethoxy-4-hydroxybenzoic acid, 6-hydroxy-5-methyl-2-naphthoic acid, 6-hydroxy-5-methoxy-2-naphthoic acid, 3-chloro-4-hydroxybenzoic acid, 2,3-dichloro-4-hydroxybenzoic acid, 3,5-dichloro-hydroxybenzoic acid, 2,5-dichloro-4-hydroxybenzoic acid, 3-bromo-4-hydroxybenzoic acid, 6-hydroxy-5-chloro-2-naphthoic acid, 6-hydroxy-7-chloro-2-naphthoic acid, and 6-hydroxy-5,7-dichloro-2-naphthoic acid.

In addition to the above mentioned polyesters, the LCP's used in the monolayer structures according to the invention can comprise the corresponding polyester amides. It is also possible to use polymers having a main chain containing conjugated double bonds, the monomer units of said main chain being linked to unsubstituted or substituted side chains which, together with the main chain render the polymer liquid-crystal properties. Examples of such polymers are polytiophene, polyaniline, polyacetylene, polypyrrole and polyparaphenylene substituted with alkyl chains containing at least 8 carbon atoms.

Particularly preferred liquid crystalline polymers are the following:

copolyesters of terephthalic acid, alkylhydroquinone, p-hydroxybenzoic acid and poly(alkylene terephthalate), the alkylene substituent preferably comprising ethylene or butylene and the alkyl substituent of the hydroquinone preferably comprising a lower alkyl group such as propyl or (tertiary) butyl, copolyesters of p-hydroxybenzoic acid and poly(alkylene terephthalate), the alkylene group preferably being ethylene or butylene, copolyesters of terephthalic acid, alkylhydroquinone, p-hydroxybenzoic acid and hydroxyalkylphenyl-alkanoic acids, the alkyl-substituent of the hydroquinone preferably comprising a lower alkyl group such as propyl or (tertiary) butyl, the alkanoic acid preferably containing 3 to 8 carbon atoms, propanoic acid being particularly preferred, and blockcopolyesters of trimellithic imide-terminated poly (THF) or polysilicone, containing the imide group in para- or meta-position i.e. N-(4-carboxy-phenyl)-trimellit imide or N-(3'-acetoxy-phenyl)-trimellit imide, with acetoxybenzoic acid and at least one repeating unit selected from the group comprising diacetoxy diphenyl, hydroquinone diacetate, terephthalic acid, a trimer designated HBA-HQ-HBA (the synthesis of which is described in Europ. Polym. J. 20, 3, 225–235 (1984), and poly(ethylene terephthalate) (PET).

According to the invention, it is particularly preferred to use liquid crystalline polymers having as high chain linearity as possible. These kinds of LCP's are particularly well suited for use as barrier components in blends with thermo-tropic polymers.

The molecular weight of the liquid crystal polymer used in the present invention depends on the character of the repeating units of the LCP. Usually, the molecular weight is in the range of about 1,000 to 300,000. If fully aromatic polyesters are used as LCP's, their molecular weight is typically in the range of about 2,000 to 200,000, preferably about 10,000 to 50,000.

More general details on liquid crystalline polymers and their properties and applications are given in an article titled "Liquid Crystal Polymers and Their Applications" by Chung et al. in Handbook of Polymer Science and Technology, Vol. 2 (1989) 625–675.

The isotropic polymer of the monolayer structure can comprise any suitable polymer material which has the desired properties regarding resistance to penetration of water vapor as well as regarding strength and processability.

As examples of the isotropic polymers, the following may be mentioned: polyolefins such as polyethylene, polypropylene, polybutylene, polyisobutylene, poly(4-methyl-1-pentylene), including copolymers of ethylene and propylene (EPM, EPDM) and chlorinated (PVC) and chlorosulphonated polyethylenes. The isotropic polymer may also be comprised of the corresponding polyalkanes, which contain styrene (PS), acryl, vinyl and fluoroethylene groups, and different polyesters, such as poly(ethylene terephthalate), poly(butylene terephthalate) and polycarbonate, polyamides and polyethers (e.g. poly (phenylene ether). Particularly preferred polymers are the polyolefins and polyesters.

The molecular weights of the preferred isotropic thermoplastic polymers are usually in a range from about 5,000 to 50,000, preferably about 10,000 to 30,000. The flexural modulus (0.5–0.25%) of the matrix polymer is preferably about 100–10,000 MPa, in particular about 500–5000 MPa.

When compatibilizers are used in the compounds according to the invention, they typically consist of reactive compatibilizer whose functional groups comprise, for example, carboxy, anhydride, epoxy, oxazolino, hydroxy, isocyanate, acylacetam and carbodiimide groups. The polymer residues of the compatibilizer can comprise co- and terpolymers, grafted polyolefins, grafted polystyrene and thermoplastic elastomers. The polar groups of polyolefinic copolymers are generally acrylic esters, functional acrylic acid groups, and maleic anhydride groups. The polar groups of the terpolymers can be maleic anhydride groups, hydroxyl groups and epoxy groups, of which the first-mentioned are particularly preferred. The styrene block copolymers can consist of polystyrene segments and flexible elastomer segments. Typical styrene block copolymers are SBS (styrene/butadiene/styrene-copolymer), SIS (styrene/isoprene/styrene-copolymer) and SEBS (styrene/ethylene butylene/styrene-copolymer).

Of the polymer blend additives, fillers, pigments and various substances which promote the processing of the blend can be mentioned.

Plastic additives known per se can be added to the polymer blend according to the invention. These additives comprise, for instance, stabilizers, colouring agents, lubricants, antistatic agents, fillers and fire retardants. If desired, these substances can be premixed with, e.g., the isotropic polymer before forming the polymer blend. The amounts of polymer additives are typically about 0.01 to 5%, preferably about 0.1 to 10% of the weight of the polymer blend.

Of the isotropic/anisotropic compounds according to the invention, the following are particularly preferred:

Compounds containing 5 to 40 parts by volume in particular 20 to 40 parts by volume of a fully aromatic copolyester liquid crystalline polymer, and 60 to 95 parts by volume of isotropic polyolefins, such as polyethylene or polypropylene. For low oxygen permeability applications it is preferred not to include any compatibilizer in the compounds. However, in applications where good impact strength is needed, an amount of about 0.1 to 2 part of weight of a compatibilizer can be included.

Monolayer structure

The structure of a section of the monolayer is depicted in FIG. 1.

As shown in FIG. 1, at least one lamellar layer 1 of the liquid crystalline polymer component is embedded in a continuous matrix 2 composed of the thermoplastic polymer. The lamellar layer is arranged in at least essentially parallel orientation with the surface of the matrix polymer and it comprises a number of polymer sheets or plates 1' which are overlapping so as at least substantially to cover the width and length of the film.

Figure 2:
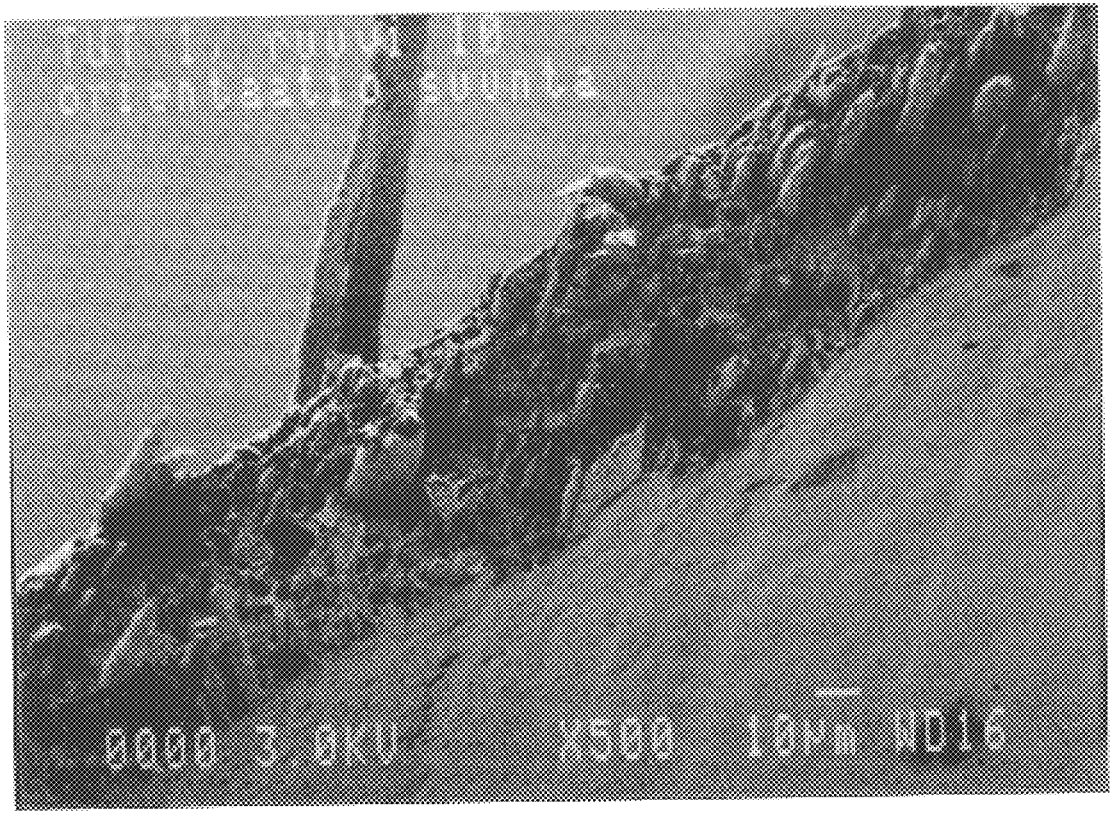
FIG. 2 shows a SEM micrograph of the fracture surface of a LCP/PP compound according to the invention.

It should be noticed that FIG. 1 represents a simplified hypothetical case, wherein the LCP is largely gathered in the clearly defined lamellar layer(s). In practice, the LCP is at least to some extent dispersed throughout the matrix polymer and the "layers" represent simply high concentration regions of the LCP. The surface of the structure is primarily made up of the isotropic polymer. FIG. 2 depicts a typical fraction surface SEM micrograph. The dispersion of the LCP's in the matrix polymer is clearly seen as are the overlapping sheets or plates.

It is preferred to have monolayer structures with the liquid crystalline polymer deformed into sheet- or plate-like morphology (instead of, for instance, fibrillar morphology), said sheets or plates being overlapping and forming at least one lamellar layer 1 which at least substantially covers the whole area of the sample in the machine direction.

"Sheet- or plate-like morphology" should, within the context of this invention, be construed to cover any structural configuration of the LCP, in which the polymer biaxial dimension is larger than the LCP's dimension in the direction of the third axis. Thus, the "plates" are sometimes comprised of elongated structure, which resemble tapes or ribbons rather than sheets or plates.

The LCP content is crucial to the oxygen and water vapor permeability of the monolayer structures according to the invention. As the examples below will show, with LCP weight fractions of about 40 percent by weight (corresponding to about a 30 percent volume fraction, structures were obtained having an oxygen barrier on the same level as polyamides (such as PA6) and poly(ethylene terephthalate). With lower LCP contents there can in practice be some difficulties in forming a lamellar layer, wherein the plate-like LCP domains overlap each other. Nevertheless, experimental data show a clear improvement of the oxygen barrier of the matrix polymer even with contents of the LCP component as low as 5–14 vol-%. The lower limit of the LCP of the monolayer structures according to the invention is therefore set at about 5 vol-%.

The thickness of the monolayer films depends on the processing conditions and the relative amounts of the various components of the polymer compounds. Typically, monolayer films according to the invention can be prepared in average thicknesses in the range of about 10 to 1000 $\mu$m, a range of about 40 to about 100 $\mu$m being preferred. The diameter of the LCP sheets or plates typically is in the range of about 5 to about 20 $\mu$m.

Processing of polymer films or bottles by blow molding

Generally, the isotropic and anisotropic polymers are first mixed in order to form a blend which optionally contains additives and adjuvants. Then, the liquid crystalline polymers are compounded with the thermoplastics by melt processing. The applicable mixing methods include batch or continuous processes. Preferably single- or twin-screw extruders are used for compounding the liquid crystalline polymer with the thermoplastic.

The compounds according to the invention are processed according to methods known per se in polymer technology to manufacture the final products.

The basic principle governing the compounding and processing of the blend component into the final products is the morphology control of the isotropic/anisotropic blend which can be achieved by different processing techniques. As mentioned above, the best barrier of the final application is obtained when anisotropic LCP forms plate- or sheet-like domains in the isotropic polymer matrices. Sheet-like morphology of LCP based blends can be generated, e.g. by injection molding, blow molding and film extrusion. Because, the liquid crystalline polymer blends are "in situ" compounds, a preferred embodiment of the invention comprises processing the blends by extrusion using sheet dies or rotating dies or stenter frame or film blowing, i.e. biaxial processing methods.

It is known that elongational flow is more effective in inducing orientation of LCP's than shear. In fact, the orientation buildup of LCP's is independent of shear rate, the more pseudoplastic the flowing behavior, the more orientated the polymer. Also, longer dies give rise to better orientation. Thus, the processing technique for preparing the monolayer structure of the invention should preferably provide biaxial orientation of the compounds based on elongational deformation in draw-down or on shear, for example during cooling. Extrusion using long dies and/or processing times is therefore advantageous.

Another preferred embodiment comprises using the injection molding technique. As described in more detail below, the viscosity of the isotropic component should be higher than the viscosity of the LCP. In injection molding the flow field can be divided into elongational and shear deformation parts. This will lead to heterogeneous morphology, where the isotropic and anisotropic components are located on the skin or in the core section, e.g. depending on the viscosity ratio of the components.

The permeabilities of, in particular, uncompatibilized PO/LCP-blends can be controlled with the aid of the processing parameters. To mention an example, during injection molding moisture vapor barriers of PP/LCP-blends can be increased by omitting the holding pressure, while the oxygen barrier decreases. This relates to the morphology of the blend. The LCP content and the use of a compatibilizer also have an effect on oxygen and moisture vapor permeabilities.

Incompatibility of blend components favors domain formation of the minor component. Since lamellar, overlapping LCP domains provide good oxygen barrier properties when the amount of the LCP component is smaller than that of the isotropic polymer, it has been found that the viscosity ratio, $\lambda$, of the LCP and the isotropic polymer [$\lambda=\eta_{LCP}/\eta_{MATRIX\ POLYMER}$] should be as low as possible. In order to achieve a good oxygen barrier in monolayer structures with relatively low LCP content, the viscosity of the LCP must be less than that of the isotropic polymer (=$\lambda$<<1). Preferred are viscosity ratios in the range from about 0.0001 to 0.9, in particular in the range from about 0.001 to 0.5. This leads to elongated and flattened LCP ribbons or plates dispersed in the high viscosity matrix formed by the isotropic polymer.

Figure 3:
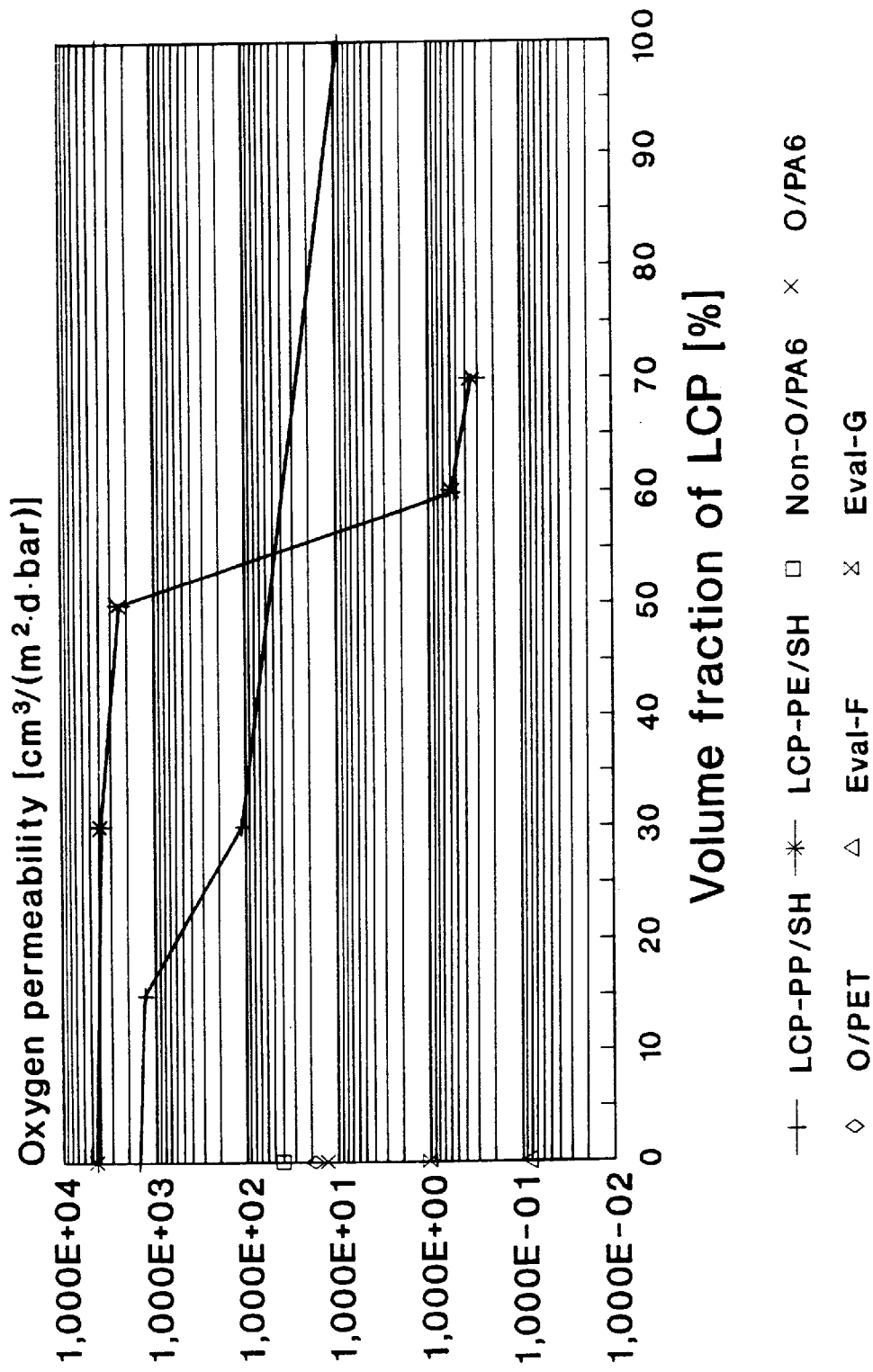
FIG. 3 shows the oxygen permeability as a function of the volume fraction of the LCP (in vol-%) for different polymer film samples.

FIG. 3 shows the oxygen permeability of isotropic polymer/anisotropic polymer compounds as a function of the LCP content.

For the purpose of comparing compounds prepared at different viscosity ratios, three polymer compounds were prepared containing 30, 50 and 60 vol-% of a polyesteramide LCP (Vectra B950, supplied by Hoechst-Celanese), the isotropic polymer of the compounds being a LDPE (NCPE 1515, supplied by Neste Oy). The viscosity ratio $\lambda$ between the LCP and the LDPE was 1.5 at 300° C. (1000 s$^{-1}$). A fourth sample comprising a multilayer structure was prepared from the same polymers, containing 70 vol-% of the LCP. The films were extruded using a sheet die.

Four film samples based on monolayer structures according to the present invention were prepared from an aromatic copolyester of tert-butylhydroquinone, terephthalic acid, hydroxybenzoic acid and poly(ethylene terephthalate) and a polypropylene homopolymer (VB19 43B, supplied by Neste Oy). The viscosity ratio between the LCP and the PP was 0.07 at 260° C. and 500 s$^{-1}$. One series of compounds having LCP contents of 14 vol-% was processed into films by the sheet die technique (film processing is also possible using techniques based on rotating dies).

The oxygen permeabilities of a number of known barrier materials are included in FIG. 3.

It appears that, as long as the LCP content is less than 50 vol-%, the oxygen permeability improvement of LCP/LDPE compounds when the viscosity ratio is higher than 1 ($\lambda$>1) is not significant in comparison to the permeability of a neat PE polymer. However, at the same LCP contents, the resistance of a compound film comprising a monolayer structure prepared in accordance with the present invention ($\lambda$<<1) to oxygen penetration is 500 to 700 times better. Thus, when the viscosity ratio is low, it is possible to get fairly good oxygen barrier properties even with low LCP content. A LCP/PP compound film with 30 vol-% LCP has an oxygen permeability only slightly inferiour to PA6. The figure also shows that when the LCP content of a LCP/PE compound increases over 50 vol-%, a phase inversion takes place. After the inversion point, the LCP forms the continuous phase and the oxygen permeability radically decreases. The permeability of LCP/PE compound films with 60 to 70 vol-% LCP is very close to the best known barrier polymer (EVOH).

Of course, the starting level of the neat components has an effect on the final gas transport properties, as seen in FIG. 3. The melt elasticity has also an influence on domain deformation of the dispersed phase.

Low processing temperatures will, in some cases, provide excellent barrier properties against oxygen penetration. It appears that there is a processing temperature span for each isotropic polymer/LCP pair which will result in laminar morphology of the LCP.

Many isotropic polymers, in particular the polyolefins, have good resistance to penetration of water vapor. The monolayer structures according to the invention will provide good to excellent resistance to oxygen penetration while still maintaining most of the low water vapor permeability properties of the polyolefins.

Laminate applications

The films according to the invention can be used for the preparation of laminates. In addition to the monolayer film, the laminates according to a preferred embodiment of the invention comprise at least one layer consisting of a lignocellulosic material made up of, for instance, cellulose fibers. However, it is also possible to prepare laminates comprising films of other polymeric materials. Thus, the monolayer structures according to the invention can be used as barrier layers in traditional multilayered polymer structures instead of polyamide, poly(ethylene terephthalate) or EVOH.

The cellulose fiber layers in the laminate can be comprised of paper webs, paperboard webs or similar cellulose based products. The cellulose contained in the layers can stem from chemical or mechanical pulp which further can be bleached or unbleached pulp. The surface area weight of the material used for the cellulose fiber layer is typically approx. 10 to 500 g/m$^2$. Typically, paperboard with a surface area weight of approx. 100 to 250 g/m$^2$ is employed.

In addition to the barrier layer, the cellulose fiber-based laminates can contain other polymer layers as well. Said layers can be formed from thermoplastic polymers such as polyolefins, polyesters or similar polymers. Different types of copolymers are also suitable for use in the polymer material layers. As an example of a suitable copolymer, an ethylvinyl acetate copolymer can be mentioned. The polymer or the cellulose fiber material can be replaced by regenerated cellulose polymer materials such as cellophane. The surface area weights of the polymer layers in the laminate are in the range of approx. 1 to 250 g/m$^2$, preferably approx. 5 to 100 g/m$^2$.

The laminates according with the invention can be produced by laminating a film a the monolayer structure on a cellulosic fiber or polymeric layer by methods known per se. Thus, the method can be implemented by using extrusion coating, the monolayer polymer structure being produced by extrusion into a sheet which is adhered to the surface of a cellulose fibre web. A second polymeric layer, which is applied on either side of the monolayer/cellulosic layer combination, can be adhered at another stage. The method can also be implemented by using extrusion laminating which operates by feeding said polymer sheet from the extruder between at least two webs and then adhering it to these. One or both of the webs can be formed by a cellulose fibre web and/or a second polymer material. This method is implemented particularly advantageously using the coextrusion technique in which all polymer layers of the laminate are produced in a single stage in a coextruder.

The laminates according to the invention can be produced into packaging materials, bags, wrappers, moisture-proof papers and similar products exhibiting oxygen and moisture vapor barrier capability. Paperboard grades for liquid product packages, e.g., milk and juice cartons, are preferred application for the laminates described above.

Industrial applicability

As mentioned above, the monolayer structures according to the invention can be used in barrier vessels (e.g. gasoline tanks), barrier containers (e.g. containers for foodstuffs, household chemicals and other chemicals; food jars, microwave cups), and barrier films (e.g. barrier layer in liquid packages and bottles). Some of the LCP blends are somewhat brittle, a problem which can be avoided by using coating techniques to provide composites containing the monolayer as a part of the structure. One particularly suitable substrate is comprised of paperboard.

In the following, the invention will be illustrated with the help of working examples. The oxygen gas and water vapor permeabilities of the LCP-PP films were tested according to the following standards:

oxygen gas transmission rate: ASTM D 3985 - 81 (Reapproved 1988)

water vapor transmission rate: ASTM F 1249 - 90

The standard Test Method ASTM D 3985 - 81 employs a coulometric sensor for determining oxygen gas transmission rate ($O_2$GTR) through plastic film and sheeting. The sample to be tested is first equilibrated in a dry-test environment, the relative humidity of which is less than 1%. Then the specimen is mounted as a sealed semi-barrier between two chambers at ambient atmospheric pressure. One chamber is slowly purged by a stream of nitrogen and the other chamber contains oxygen. As oxygen gas permeates through the film into the nitrogen carrier gas, it is transported to the coulometric detector where it produces an electrical current, the magnitude of which is proportional to the amount of oxygen flowing into the detector per unit time.

The barrier results are based on at least two specimens. It should be noticed that gas transport coefficients for the series of films with varying thickness were calculated for a value of 50 µm.

EXAMPLE 1

Preparation of monolayer structures

As matrix material for the monolayer structure, a polypropylene of grade VB19 43B for biaxially oriented film was chosen. This polypropylene is supplied by Neste Oy, Finland. The recommended processing temperature, analogous to the melt temperature, of the neat polypropylene is 230 to 290° C., depending on the processing equipment. The LCP's used were a copolyester of p-hydroxybenzoic acid (HBA) and polyethyleneterephthalate (PET) marketed under the name Rodrun LC-3000 (Unitika Ltd.). This specific LCP has an overlapping processing temperature range with the PP used. The PHB/PET molar ratio of the LCP is 60/40, the relative viscosity $\eta_{rel}$ is 1.42 (tetrachloroethane/phenol=1/1, 35° C.), and the glass transition point is 54° C.

A random terpolymer of ethylene, butylene acrylate and glycidyl methacrylate (E/BA/GMA) supplied by Norsolor under the trade name Lotader AX 8660 was used as a compatibilizer. Its melting point is 79° C.

The polymer compounds were produced by a laboratory twin-screw extruder Berstorff ZE 25×33 D, and the screw configuration was Polyblens 1. The pellet blend was dried at 80° C. for 9 hours in an air oven before extrusion.

The recipe of the LCP-PO compound blend was

| LCP | 40.0 wt- % |
|---|---|
| PP | 57.5 wt- % |
| Compatibilizer | 2.5 wt- % |

Two batches of the above blend composition were compounded in different ways in order to produce dissimilar morphologies:

| Batch A: $T_1 = 50°$ C.; $T_2 - T_8 = 250°$ C. |
|---|
| melt temperature: $T_m = 264°$ C. (measured value) |
| melt pressure: $p_m = 12$ bar |
| screw speed: f = 250 rpm |
| output: $Q_m = 9$ kg/h |
| Batch B: $T_1 = 50°$ C.; $T_2 - T_8 = 230°$ C. |
| melt temperature: $T_m = 243°$ C. (measured value) |
| melt pressure: $p_m = 13$ bar |
| screw speed: f = 220 rpm |
| output: $Q_m = 9$ kg/h |

The viscosity ratio of the polymers of both batch compounds was 0.06 at 260° C. and $500^{-1}$.

After compounding the Batch B LCP-PO compound consisted of relatively large LCP domains dispersed in the matrix material. The diameter of the domains was about 10 µm. Batch A compound comprised highly dispersed small LCP domains, the diameter of which was 1 to 5 µm.

The compounded samples were processed into films using the sheet die technique at various extruder and die temperatures. It is also possible to use known rotating techniques, such as cone extrusion or rotating dies.

The oxygen barrier permeability of Batch A was 1323 $cm^3/(m^2 \cdot d \cdot bar)$ and the one of Batch B 115 $cm^3/(m^2 \cdot d \cdot bar)$.

It appears from the figures that better results are obtained with LCP-PP compounds of Batch B, resulting in large overlapping sheets of LCP embedded in the PP matrix. The processing temperature window is rather narrow, extending from about 195 to 220° C. Too low and especially too high extrusion temperatures impair the oxygen barrier properties. The morphology of the starting compound is one of the most important factors.

EXAMPLE 2

The effect of processing parameters in injection molding, the LCP content, and the compatibilizer on the oxygen barrier properties of injection-molded PO/LCP specimens Plaques with a LCP weight fraction of 35% were prepared by injection molding, and the permeability results compared with those of neat barrier polymers.

The permeability to gases of fully aromatic thermotropic LCP's is as low or lower than that of polyacrylonitrile (PAN), which is one of the best existing barrier polymers. As indicated above, the present monolayer structures have almost as good oxygen barrier properties as polyamide (PA6) or poly(ethylene terephthalate) (PET), when the weight fraction of LCP is 35% (Table 1).

TABLE 1

Oxygen barrier properties of injection molded specimens. Measurements based on the plaque mold geometry.

| Sample | Oxygen, $O_2$ mol/(m.s.Pa) × $10^{-17}$ |
|---|---|
| Neste PP, VB65 50B[a)] | 37 |
| PP65/LCP35-blend (with holding pressure)[a)] | 1.4 |
| PP65/LCP35-blend (without holding pressure)[a)] | 1.7 |
| LCP, Rodrun LC-3000[a)] | 0.11 |
| PA6[a)] | 0.4–0.6 |
| PET[a)] | 0.6–0.8 |
| PAN[b)] | 0.008–0.2 |
| EVOH[a)] | 0.005–0.05 |

[a)]at 23° C., 50% rh
[b)]at 23° C., 0% rh

The corresponding values of moisture vapor properties are presented in Table 2. The commercial liquid crystalline polymer used has high moisture vapor permeability, so it does not disturb good water barrier property of polyolefins. Both good oxygen and moisture barrier properties are combined in PP/LCP-blends.

TABLE 2

Moisture vapor barrier properties of injection molded specimens. Measurements based on the plaque mold geometry.

| Sample | Moisture vapor, $H_2O$ mol/(m.s.Pa) × $10^{-15}$ |
|---|---|
| Neste PP, VB65 50B[a)] | 1.2 |
| PP65/LCP35-blend (with holding pressure)[a)] | 1.3 |
| PP65/LCP35-blend (without holding pressure)[a)] | 1.0 |
| LCP, Rodrun LC-3000[a)] | 0.4 |
| PA6[b)] | 40–55 |
| PET[b)] | 2.5–5.0 |
| PAN[b)] | 0.75–4.0 |
| EVOH[c)] | 3.0–7.5 |

[a)]at 38° C., 90% rh
[b)]at 23° C., 100% rh
[c)]at 40° C., 90% rh

An additional sample with lower LCP content was prepared and its oxygen permeability compared with that of the sample with higher LCP content.

TABLE 3

The effect of LCP content on oxygen permeability of injection molded samples.

| Sample | Oxygen, $O_2$ mol/(m.s.Pa) × $10^{-17}$ |
|---|---|
| PP80/LCP20-blend | 9.2 |
| PP65/LCP35-blend | 2.0 |

Finally the effect of a commercial compatibilizer, Lotader 8660 (supplied by Norsolor), on the oxygen barrier properties of the PP/LCP blend was tested by an compatibilized sample. The oxygen barrier is decreasing due to the compatibilizer, as shown in Table 4.

TABLE 4

The effect of a compatibilizer on oxygen permeability of injection molded samples.

| Sample | Oxygen, $O_2$ mol/(m.s.Pa) × $10^{-17}$ |
|---|---|
| PP70/LCP30-blend | 2.0 |
| PP68/COMP2/LCP30-blend | 4.3 |

What is claimed is:

1. An extruded compounded polymer film, comprising at least one anisotropic liquid crystalline polymer; at least one isotropic polymer; and a compatibilizer that facilitates interfacial adhesion between the anisotropic and the isotropic polymers, said isotropic polymer forming a polymer matrix of the film and said anisotropic liquid crystalline polymer being essentially located in at least one lamellar layer embedded in the polymer matrix and substantially extending over a length and width of the film, the film having an oxygen transmission rate that is less than about 150 $cm^3$/ ($m^2$·d·bar), determined according to ASTMD 3985 - 81, and a thickness of 10 to 100 μm.

2. A polymer film according to claim 1, wherein said lamellar layer of said anisotropic liquid crystalline polymer is provided as overlapping sheets or plates of said liquid crystalline polymer in said isotropic polymer matrix.

3. A polymer film according to claim 1, wherein the compounded polymer contains 5 to 40 parts by volume of the anisotropic liquid crystalline polymer and 95 to 60 parts by volume of the isotropic polymer.

4. A polymer film according to claim 3, which comprises 0.1 to 10 parts by volume of the compatibilizer.

5. A polymer film according to claim 1, wherein the liquid crystalline polymer is a polymer which is formed by reacting together at least two components from the group consisting of the following general formulas: a dicarboxylic acid of formula HOOC—$R_1$—COOH; a diol of formula HO—$R_2$OH; and an oxycarboxylic acid of formula HO—$R_3$—COOH, wherein $R_1$, $R_2$ and $R_3$ represent 1) a bivalent aromatic hydrocarbon group, 2) a group of formula $R_4$—X—$R_5$, in which $R_4$ and $R_5$ represent a bivalent hydrocarbon group and X is one of an oxygen atom, a sulphur atom, a sulphonyl, carbonyl, alkylene, an ester group, and a single bond, 3) a xylylene group and 4) a bivalent aliphatic hydrocarbon group.

6. A polymer film according to claim 5, wherein the anisotropic polymer is an aromatic copolyester.

7. A polymer film-according to claim 1, wherein the isotropic polymer is selected from the group consisting of polyolefins and polyesters.

8. A polymer film according to claim 7, wherein the isotropic polymer is selected from the group consisting of polyethylene, polypropylene, polybutylene, polyisobutylene, poly(4-methyl-1-pentylene), copolymers of ethylene and propylene (EPM, EPDM), chlorinated and chlorosulphonated polyethylenes, and poly(ethylene terephthalate), poly(butylene terephthalate), and polycarbonate.

9. A polymer film according to claim 1, wherein the liquid crystalline polymer is selected from the group consisting of a copolyester of p-hydroxybenzoic acid (PHB) and poly (ethylene terephthalate) (PET); and an aromatic copolyester of tertbutylhydrokinone (t-BuHQ), terephthaalic acid (T), hydroxybenzoic acid (HBA), and poly(ethylene terephthalate) (PET), and the isotropic polymer is selected from the group consisting of polypropylene and polyethylene.

10. A polymer film according to claim 9, wherein the liquid crystalline polymer is t-BuHQ25/T25/-HBA35/PET15.

11. A process for preparing a polymer film, comprising the steps of:

blending an isotropic polymer and an anisotropic liquid crystal polymer to provide a polymer blend comprising about 60 to about 95 parts by volume of a polyolefin, about 5 to 40 parts by volume of the anisotropic liquid crystal polymer, and a compatibilizer;

melt processing said polymer blend at a viscosity ratio value between the anisotropic polymer and the isotropic polymer $[\lambda = \eta_{anisotropic\ polymer}/\eta_{isotropic\ polymer}]$ in a range of about 0.001 to 0.5 in order to produce a compounded polymer compound; and extruding said compound polymer into said polymer film in which the isotropic polymer forms a polymer matrix of the film and the anisotropic liquid crystalline polymer is essentially located in at least one lamellar layer embedded in the polymer matrix and extends over a length and width of the film so as to form a film having a thickness of 10 to 100 $\mu$m, the film having an oxygen transmission rate that is less than about 150 $cm^3$/($m^2 \cdot d \cdot bar$), determined according to ASTMD 3985-81.

12. A process according to claim 11, wherein the melt processing step includes processing the polymer blend at a viscosity ratio value between the anisotropic polymer and the isotropic polymer in a range of about 0.01 to 0.1.

13. A process according to claim 11, wherein the compounded polymer processing step includes processing the compounded polymer to a film at a temperature below the melting temperature of the anisotropic polymer.

14. A process according to claim 11, wherein the melt processing including extruding.

15. A laminate, comprising:

a substrate; and at least one polymer layer coated on a surface of said substrate so that said polymer layer forms a barrier to transport of oxygen and water vapor through the laminate, the polymer layer comprising a compounded polymer film formed of at least one anisotropic liquid crystalline polymer, at least one isotropic polymer, and a compatibilizer that facilitates interfacial adhesion between the anisotropic and the isotropic polymers, said isotropic polymer forming a polymer matrix of the film and said anisotropic liquid crystalline polymer being essentially located in at least one lamellar layer embedded in the polymer matrix and substantially extending over a length and width of the film, the film having an oxygen transmission rate that is less than about 150 $cm^3$/($m^2 \cdot d \cdot bar$), determined according to ASTM D 3985-81, and a thickness of 10 to 100 $\mu$m.

16. A laminate according to claim 15, wherein the substrate is paper board.

17. A method for manufacturing a container for foodstuff and chemicals, comprising the steps of forming a container from a laminate comprising:

a paper board substrate; and at least one polymer layer coated on a surface of said substrate so that said polymer layer acts as a barrier to transport of oxygen and water vapor through the laminate, the polymer layer comprising a compounded polymer film having a thickness of 10 to 100 $\mu$m formed of at least one anisotropic liquid crystalline polymer at least one isotropic polymer, and a compatibilizer that facilitates interfacial adhesion between the anisotropic and the isotropic polymers, said isotropic polymer forming a polymer matrix of the film and said anisotropic liquid crystalline polymer being essentially located in at least one lamellar layer embedded in the polymer matrix and substantially extending over a length and width of the film, the film having an oxygen transmission rate that is less than about 150 $cm^3$/($m^2 \cdot d \cdot bar$), determined according to ASTMD 3985-81.

* * * * *